United States Patent
Akkarakaran et al.

(10) Patent No.: US 10,660,056 B2
(45) Date of Patent: May 19, 2020

(54) TECHNIQUES FOR TIMING CONTROL WITH FILTERING IN ORTHOGONAL FREQUENCY DIVISION MULTIPLEXING-BASED SYSTEMS

(71) Applicant: QUALCOMM Incorporated, San Diego, CA (US)

(72) Inventors: Sony Akkarakaran, Poway, CA (US); Peter Gaal, San Diego, CA (US); Xiao Feng Wang, San Diego, CA (US); Yi Huang, San Diego, CA (US); Tao Luo, San Diego, CA (US); Juan Montojo, San Diego, CA (US); Renqiu Wang, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/114,451

(22) Filed: Aug. 28, 2018

(65) Prior Publication Data
US 2019/0082406 A1    Mar. 14, 2019

Related U.S. Application Data

(60) Provisional application No. 62/556,184, filed on Sep. 8, 2017.

(51) Int. Cl.
*H04L 12/28* (2006.01)
*H04W 56/00* (2009.01)
(Continued)

(52) U.S. Cl.
CPC ......... *H04W 56/004* (2013.01); *H04L 5/0048* (2013.01); *H04L 25/03834* (2013.01);
(Continued)

(58) Field of Classification Search
CPC .......... H04L 25/03834; H04L 27/2602; H04L 27/2646; H04L 27/2614; H04W 56/004; H04W 72/042; H04W 72/04
(Continued)

(56) References Cited

U.S. PATENT DOCUMENTS 8,149,969 B2    4/2012  Khan et al.
9,246,721 B1*   1/2016  Martinez .............. H04B 1/0007
(Continued)

FOREIGN PATENT DOCUMENTS

EP    1998586 A1    12/2008
EP    2733900 A1    5/2014

OTHER PUBLICATIONS

International Search Report and Written Opinion—PCT/US2018/048468—ISA/EPO—dated Feb. 25, 2019.

*Primary Examiner* — John Pezzlo
(74) *Attorney, Agent, or Firm* — Arent Fox LLP (57) ABSTRACT

Various aspects described herein relate to techniques for timing control with filtering in orthogonal frequency division multiplexing (OFDM)-based wireless communications systems. In an aspect, the method includes determining whether time-domain filtering or frequency-domain filtering is used for a transmission signal waveform, and identifying a time delay based on a determination that the time-domain filtering is used for the transmission signal waveform. The method further includes applying a timing correction based on the identified time delay. The techniques described herein may apply to different communications technologies, including 5th Generation (5G) New Radio (NR) communications technology.

26 Claims, 3 Drawing Sheets

(51) Int. Cl.
*H04L 27/26* (2006.01)
*H04L 25/03* (2006.01)
*H04W 76/27* (2018.01)
*H04L 5/00* (2006.01)
*H04W 72/04* (2009.01)
*H04J 1/16* (2006.01)

(52) U.S. Cl.
CPC ...... *H04L 27/2602* (2013.01); *H04L 27/2614* (2013.01); *H04L 27/2627* (2013.01); *H04L 27/2646* (2013.01); *H04W 72/042* (2013.01); *H04W 76/27* (2018.02)

(58) Field of Classification Search
USPC .......................................... 370/252, 329, 436
See application file for complete search history.

(56) References Cited

U.S. PATENT DOCUMENTS

2016/0306027 A1* 10/2016 Chrabieh ............... G01S 5/0215
2017/0257238 A1* 9/2017 Qian .................... H04L 27/2628
2019/0058616 A1* 2/2019 Matsuda ............... H04L 5/0053

* cited by examiner

TECHNIQUES FOR TIMING CONTROL WITH FILTERING IN ORTHOGONAL FREQUENCY DIVISION MULTIPLEXING-BASED SYSTEMS

CROSS-REFERENCE TO RELATED APPLICATION(S)

This application claims the benefit of U.S. Provisional Application Ser. No. 62/556,184, entitled "TECHNIQUES FOR TIMING CONTROL WITH FILTERING IN OFDM-BASED SYSTEMS" and filed on Sep. 8, 2017, which is expressly incorporated by reference herein in its entirety.

BACKGROUND

Aspects of the present disclosure relate generally to wireless communications systems, and more particularly, to techniques for timing control with filtering in orthogonal frequency division multiplexing (OFDM)-based wireless communications systems.

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., time, frequency, power, and/or spectrum). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G NR communications technology and beyond. Preferably, these improvements should be applicable to other multi-access technologies and the telecommunication standards that employ these technologies.

Accordingly, due to the requirements for increased data rates, higher system reliability, and better spectrum utilization, new or improved approaches may be desirable to enable and enhance time-domain and/or frequency-domain filtering operations in order to reach low peak-to-average power ratio (PAPR) in OFDM-based systems, to satisfy consumer demand and to improve user experience in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The purpose of the summary is to present some concepts of one or more aspects in a simplified form as a prelude to the more detailed description that is presented later.

According to an example, a method related to techniques for timing control with filtering in an OFDM-based wireless communications system is provided. In an aspect, the method may include determining to enable filtering for a transmission signal waveform such as an orthogonal frequency division multiplexing (OFDM) signal. The method may also include determining a type of filtering to apply for the filtering of the transmission signal waveform. The method may further include enabling the filtering of the transmission signal waveform based on the type of filtering. In some implementations, the method may also include identifying a time delay based on the type of filtering used for the filtering of the transmission signal waveform, and applying a timing correction based on the identified time delay.

In another aspect, an apparatus for wireless communications is provided that includes a transceiver, a memory configured to store instructions, and one or more processors communicatively coupled with the transceiver and the memory. The one or more processors may be configured to execute the instructions to determine to enable filtering for a transmission signal waveform such as an OFDM signal. The one or more processors may also be configured to execute the instructions to determine a type of filtering to apply for the filtering of the transmission signal waveform. The one or more processors may further be configured to execute the instructions to enable the filtering of the transmission signal waveform based on the type of filtering. In some implementations, the one or more processors may also be configured to execute the instructions to identify a time delay based on the type of filtering used for the filtering of the transmission signal waveform, and apply a timing correction based on the identified time delay.

In another aspect, an apparatus for wireless communications is provided that includes means for determining to enable filtering for a transmission signal waveform such as an OFDM signal. The apparatus may also include means for determining a type of filtering to apply for the filtering of the transmission signal waveform. The apparatus may further include means for enabling the filtering of the transmission signal waveform based on the type of filtering. In some implementations, the apparatus may also include means for identifying a time delay based on the type of filtering used for the filtering of the transmission signal waveform, and means for applying a timing correction based on the identified time delay.

In yet another aspect, a computer-readable medium is provided including code executable by one or more processors to perform the operation of determining to enable filtering for a transmission signal waveform such as an OFDM signal. The computer-readable medium may also include code executable by the one or more processors to perform the operation of determining a type of filtering to apply for the filtering of the transmission signal waveform. The computer-readable medium may further include code executable by the one or more processors to perform the operation of enabling the filtering of the transmission signal waveform based on the type of filtering. In some implementations, the computer-readable medium may also include code executable by the one or more processors to perform the operations of identifying a time delay based on the type of filtering used for the filtering of the transmission signal waveform, and applying a timing correction based on the identified time delay.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

In 5th Generation (5G) New Radio (NR) communications, low-PAPR waveforms such as Discrete Fourier Transform (DFT) Spread Orthogonal Frequency Division Multiplexing (OFDM) (DFT-S-OFDM) and/or PI/2 (or π/2) binary phase-shift keying (BPSK) may be used. In an aspect, low-PAPR waveforms may be used for link-budget limited cases or implementations. In another aspect, complement high-PAPR waveforms such as OFDM with Cyclic Prefix (CP-OFDM) may be used for high-capacity cases or implementations when a link-budget is not limited. In some examples, the PAPR may be reduced by using enhanced filtering techniques, which may be applied in time-domain and/or frequency-domain. To improve transmission waveform and/or air interface for 5G NR, various aspects related to enabling and improving filtering operations in OFDM-based communication systems are provided.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatuses and methods. These apparatuses and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to a wireless communications system (e.g., a 5G NR system), in particular, techniques for timing control with enhanced filtering in OFDM-based systems. In some aspects, at least one of a time-domain filtering scheme or a frequency-domain filtering scheme may be used in an OFDM-based system. In an example, time-domain filtering may be applied as convolution of filter impulse response with time-domain samples after Inverse Fast Fourier Transform (IFFT) and Cyclic Prefix (CP)-insertion operations. In another example, frequency-domain filtering may be applied by per-tone scaling of samples at the IFFT input.

In some aspects, time-domain filtering or frequency-domain filtering scheme may be applied to OFDM signals such as CP-OFDM—used in LTE downlink, NR downlink, and NR uplink, DFT-S-OFDM or single-carrier FDM (SCFDM)—used in LTE uplink and NR uplink, or interleaved FDM (IFDM)—a variant of DFT-S-OFDM using every Nth tone where N>1. In an example, PAPR reduction may be more significant for DFT-S-OFDM signals compared with OFDM signals. In an aspect, for DFT-S-OFDM signals, frequency-domain filtering may be equivalent to a circular convolution of the input to DFT-spreading operation(s) with the inverse DFT (IDFT) of tone-scaling weights.

In some aspects, one or more filter parameters may be used or configured for the proposed time-domain filtering and/or the frequency-domain filtering scheme. For example, the one or more filter parameters may include an indication of whether filtering is enabled or disabled, an indication of whether filtering is performed or done in time domain or frequency domain, and/or one or more filter coefficients. In an aspect, the one or more filter parameters may be fixed per standards or specification requirements.

In another aspect, the one or more filter parameters may be configurable via a master information block (MIB), a system information block (SIB), a Radio Resource Control (RRC) message, a medium access control (MAC) control element (MAC-CE), and/or downlink control information (DCI). For example, an RRC information element (IE) may be generated to encapsulate field elements including filtering parameters described above. The RRC IE may be subjected to encoding, such as Abstract Syntax Notation One (ASN.1) encoding, and may be included into existing IEs or RRC messages, or into a new RRC message. In another example, a new MAC-CE or DCI format may be defined with bitfields specifying the filtering parameters either explicitly or via an index into a table of possible sets of parameter combinations, where the table itself may be predetermined (e.g., based on preprogrammed settings) or configured by RRC signaling. In some examples, a new DCI format may in particular be an extension of the currently defined DCI formats, by adding more bitfields, and the presence or absence of these bitfields may be configured via RRC signaling.

In some examples, the one or more filter parameters may be implicit function(s) of other parameter(s) (e.g., waveform, modulation and coding scheme (MCS), rank, power headroom, time-span of assignment, frequency-span of assignment, numerology). In an example, filtering may be enabled (e.g., via an indication) when using PI/2-BPSK and/or DFT-S-OFDM signals. In an aspect, the one or more filter parameters may be selected based on a combination of the parameters or methods discussed above. In some cases, the one or more filter parameters may be the same or different for different portions of a transmission waveform. For example, the one or more filter parameters may be the same or different for data versus a demodulation reference signal (DMRS) within a transmission waveform.

In some situations, filtering may cause some delay. In an aspect, frequency-domain filtering may preserve some OFDM symbol boundaries. In this case, only cyclic delay within the OFDM symbol may be applied, rather than delay of entire transmit waveform.

In another aspect, time-domain filtering may cause a delay in an entire transmit waveform, relative to when filtering is being turned off. In some examples, the delay may be a function of the one or more filter parameters discussed above, and some communication systems may be sensitive to this delay. For example, in millimeter Wave (mmW) wireless signals or signals with high subcarrier spacing, the CP may be very short compared to signals with low subcarrier spacing. In this case, uplink waveforms may need to be tightly controlled to arrive within the common CP window at a base station.

To solve the delay issue in time-domain filtering, in some examples, a transmitter at a user equipment (UE) or a base station may apply a timing correction corresponding to the extra delay introduced. In an aspect, the timing correction may only be applied when filtering is active or enabled. In an example, the timing correction may be a function of the one or more filter parameters, and may be the same or different for data versus DMRS within a transmission waveform. In some implementations, the timing correction(s) may be excluded when evaluating timing-accuracy requirements, such as a maximum number or a rate of timing adjustments. Alternatively, in an example, the timing correction(s) may be included or excluded depending on other factors, such as a time duration of a resource assignment that causes or requires the filtering to be applied. In some cases, a trigger that enables filtering (e.g., a grant with PI/2 BPSK to enable time-domain filtering) may indicate one or more timing-correction behaviors (e.g., on/off, or extent of timing correction).

Each of the aspects described above are performed or implemented in connection with FIGS. 1-3, which are described in more detail below.

Figure 1:
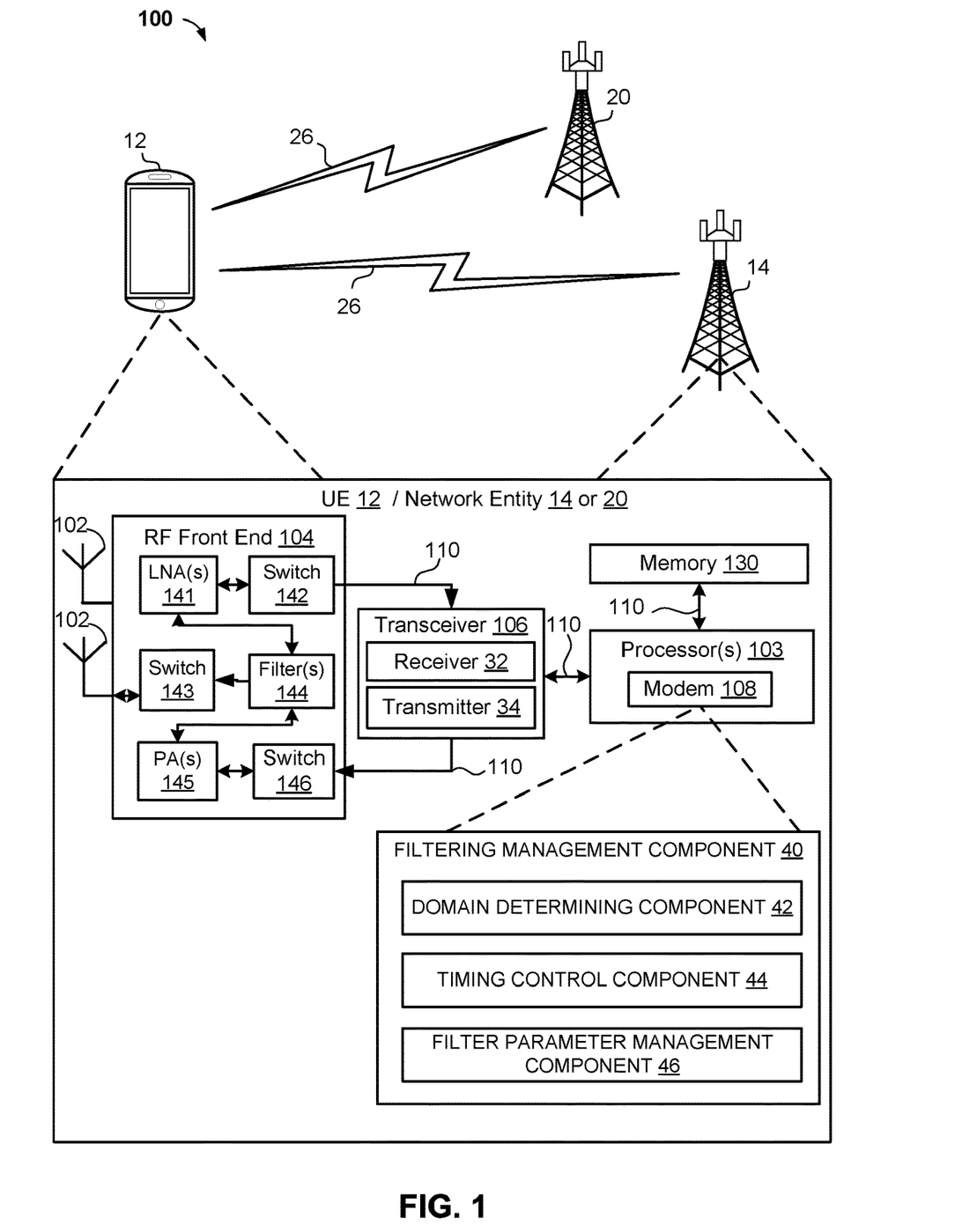
FIG. 1 is a block diagram illustrating a first example of a wireless communications system including a user equipment (UE) communicating with one or more base stations to perform timing control with filtering operations, according to one or more of the presently described aspects.

Referring to FIG. 1, in an aspect, a wireless communication system 100 includes at least one UE 12 in communication coverage of at least a network entity 14 or a network entity 20. The UE 12 may communicate with a network via the network entity 14 or the network entity 20. In some aspects, multiple UEs including the UE 12 may be in communication coverage with one or more network entities, including the network entity 14 and the network entity 20. In an aspect, the network entity 14 or the network entity 20 may be a base station, such as an evolved Node B (eNodeB or eNB) in an LTE network or a next Generation Node B (gNB) in a 5G NR network. Although various aspects are described in relation to a Universal Mobile Telecommunications Services (UMTS), LTE, or a 5G NR network, similar principles may be applied in other wireless wide area networks (WWAN). The wireless network may employ a scheme where multiple base stations may transmit on a channel. In an example, the UE 12 may transmit and/or receive wireless communications (e.g., messages or signals used for filtering operations) to and/or from the network entity 14 and/or the network entity 20. For example, the UE 12 may be actively communicating with network entity 14 and/or the network entity 20, for example, to perform timing control with filtering operations.

In some aspects, the UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. The UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for Internet of Things (IoT), or any other similar functioning device.

In some examples, the network entity 14 or the network entity 20 may be referred to as a base transceiver station, a radio base station, a radio transceiver, a basic service set (BSS), an extended service set (ESS), a NodeB, an eNodeB, an eNB, a Home NodeB, a Home eNodeB, a gNB or some other suitable terminology. The coverage area for a base station may be divided into sectors making up only a portion of the coverage area (not shown). The wireless communications system 100 may include the network entity 14 and/or the network entity 20 of different types (e.g., macro, micro, and/or pico base stations). The network entity 14 or the network entity 20 may utilize different radio technologies, such as cellular and/or Wireless Local Area Network (WLAN) radio access technologies (RAT). The network entity 14 or the network entity 20 may be associated with the same or different access networks or operator deployments. The coverage areas of the network entity 14 or the network entity 20, including the coverage areas of the same or different types of the network entity 14 or the network entity 20, utilizing the same or different radio technologies, and/or belonging to the same or different access networks, may overlap. Furthermore, the network entity 14 or the network entity 20 may be substantially any type of component that may communicate with the UE 12 to provide wireless network access at the UE 12.

According to the present aspects, the UE 12 may include one or more processors 103 and a memory 130 that may operate in combination with a filtering management component 40, a domain determining component 42, a timing control component 44, and/or a filter parameter management component 46.

In some examples, the filtering management component 40 may be configured to perform timing control or management with filtering operations as discussed herein. In an aspect, the domain determining component 42 may be configured to determine whether time-domain filtering or frequency-domain filtering is used. In an aspect, the timing control component 44 may be configured to identify a time delay caused by filtering, and/or apply a timing correction scheme based on the identified time delay. In another aspect, the filter parameter management component 46 may be configured to manage or determine one or more filter parameters used for OFDM signals with filtering operations discussed herein.

In some aspects, the filtering management component 40 may be communicatively coupled with a transceiver 106, which may include a receiver 32 for receiving and processing radio frequency (RF) signals (e.g., including MIB, SIBs, RRC messages, MAC-CE, and/or DCI), and a transmitter 34 for processing and transmitting Radio Frequency (RF) signals. The processor 103 may be communicatively coupled with the transceiver 106 and the memory 130 via at least one bus 110.

The receiver 32 may include hardware, firmware, and/or software code executable by a processor (e.g., processor 103) for receiving data, the code comprising instructions and being stored in a memory (e.g., computer-readable medium). The receiver 32 may be, for example, an RF receiver. In an aspect, the receiver 32 may receive signals transmitted by the UE 12, one or more other UEs 12 and/or one or more network entities (e.g., network entity 14 or network entity 20). The receiver 32 may obtain measurements of the signals. For example, the receiver 32 may obtain signal measurements, and may be communicatively coupled with the processor(s) 103 and assist the processor(s) 103 to determine signal measurements such as signal-to-noise ratio (SNR) or PAPR.

The transmitter 34 may include hardware, firmware, and/or software code executable by a processor for transmitting data, the code comprising instructions and being stored in a memory (e.g., computer-readable medium). The transmitter 34 may be, for example, a RF transmitter.

In an aspect, the one or more processors 103 may include a modem 108 that uses one or more modem processors. The various functions related to the filtering management component 40 may be included in the modem 108 and/or the processor(s) 103 and, in an aspect, may be executed by a single processor, while in other aspects, different ones of the functions may be executed by a combination of two or more different processors. For example, in an aspect, the one or more processors 103 may include any one or any combination of a modem processor, or baseband processor, or digital signal processor, or transmit processor, or transceiver processor associated with the transceiver 106. In particular, the one or more processors 103 may implement components included in the filtering management component 40, including the domain determining component 42, the timing control component 44, and/or the filter parameter management component 46.

The filtering management component 40, the domain determining component 42, timing control component 44, and/or the filter parameter management component 46, may include hardware, firmware, and/or software code executable by a processor for performing operating mode and cell (re)selection management and related operations. For example, the hardware may include, for example, a hardware accelerator, or specialized processor. In an aspect, the term "component" as used herein may be one of the parts that make up a system, may be hardware, firmware, and/or software, and may be divided into other components.

Moreover, in an aspect, the UE 12 may include an RF front end 104 and the transceiver 106 for receiving and transmitting radio transmissions, for example, wireless communications 26. For example, transceiver 106 may transmit or receive one or more signals. The transceiver 106 may measure a received pilot signal in order to determine signal quality (e.g., based on PAPR) and for providing feedback to the network entity 14 or the network entity 20. For example, the transceiver 106 may communicate with the modem 108 to transmit messages generated by the filtering management component 40 and to receive messages and forward them to the filtering management component 40.

The RF front end 104 may be communicatively coupled with one or more antennas 102 and may include one or more low-noise amplifiers (LNAs) 141, one or more switches 142, 143, one or more power amplifiers (PAs) 145, and one or more filters 144 for transmitting and receiving RF signals. In an aspect, the components of the RF front end 104 may be communicatively coupled with the transceiver 106 (e.g., via one or more communication links or buses 110). The transceiver 106 may be communicatively coupled with one or more modems 108 and/or the processor 103.

In an aspect, the LNA 141 may amplify a received signal at a desired output level. In an aspect, each LNA 141 may have a specified minimum and maximum gain values. In an aspect, the RF front end 104 may use one or more switches 142, 143 to select a particular LNA 141 and its specified gain value based on a desired gain value for a particular application. In an aspect, the RF front end 104 may provide measurements (e.g., energy-to-interference ratio (Ec/Io)) and/or applied gain values to the filtering management component 40.

The one or more PA(s) 145 may be used by the RF front end 104 to amplify a signal for an RF output at a desired output power level. In an aspect, each PA 145 may have a specified minimum and maximum gain values. In an aspect, the RF front end 104 may use one or more switches 143, 146 to select a particular PA 145 and a specified gain value of the PA 145 based on a desired gain value for a particular application.

The one or more filters 144 may be used by the RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be communicatively coupled with a specific LNA 141 and/or PA 145. In an aspect, the RF front end 104 may use one or more switches 142, 143, 146 to select a transmit or receive path using a specified filter 144, LNA, 141, and/or PA 145, based on a configuration as specified by the transceiver 106 and/or the processor 103.

The transceiver 106 may be configured to transmit and receive wireless signals through an antenna 102 via the RF front end 104. In an aspect, the transceiver 106 may be tuned to operate at specified frequencies such that the UE 12 may communicate with, for example, the network entity 14 or the network entity 20. In an aspect, for example, the modem 108 may configure the transceiver 106 to operate at a specified frequency and power level based on the UE configuration of the UE 12 and communication protocol used by the modem 108.

In an aspect, the modem 108 may be a multiband-multimode modem, which may process digital data and communicate with the transceiver 106 such that the digital data is sent and received using the transceiver 106. In an aspect, the modem 108 may be multiband and be configured to support multiple frequency bands for a specific communications protocol. In an aspect, the modem 108 may be multi-mode and be configured to support multiple operating networks and communications protocols. In an aspect, the modem 108 may control one or more components of the UE 12, the network entity 14, or the network entity 20 (e.g., RF front end 104, transceiver 106), to perform operating mode and cell (re)selection procedures or enable transmission and/or reception of signals based on a specified modem configuration. In an aspect, the modem configuration may be based on the mode of the modem and the frequency band in use. In another aspect, the modem configuration may be based on UE configuration information associated with the UE 12 as provided by the network.

In some aspects, the UE 12 may further include the memory 130, such as for storing data used herein and/or local versions of applications or the filtering management component 40 and/or one or more subcomponents of the filtering management component 40 being executed by the processor(s) 103. The memory 130 may include any type of computer-readable medium usable by a computer or processor(s) 103, such as random access memory (RAM), read only memory (ROM), tapes, magnetic discs, optical discs, volatile memory, non-volatile memory, and any combination thereof. In an aspect, for example, the memory 130 may be a computer-readable storage medium that stores one or more computer-executable codes defining filtering management component 40 and/or one or more of the subcomponents of the filtering management component 40, and/or data associated therewith, when the UE 12 and/or the network entity 14 or the network entity 20 is operating the processor(s) 103 to execute the filtering management component 40 and/or one or more subcomponents of the filtering management component 40. In another aspect, for example, the memory 130 may be a non-transitory computer-readable storage medium.

Figure 2:
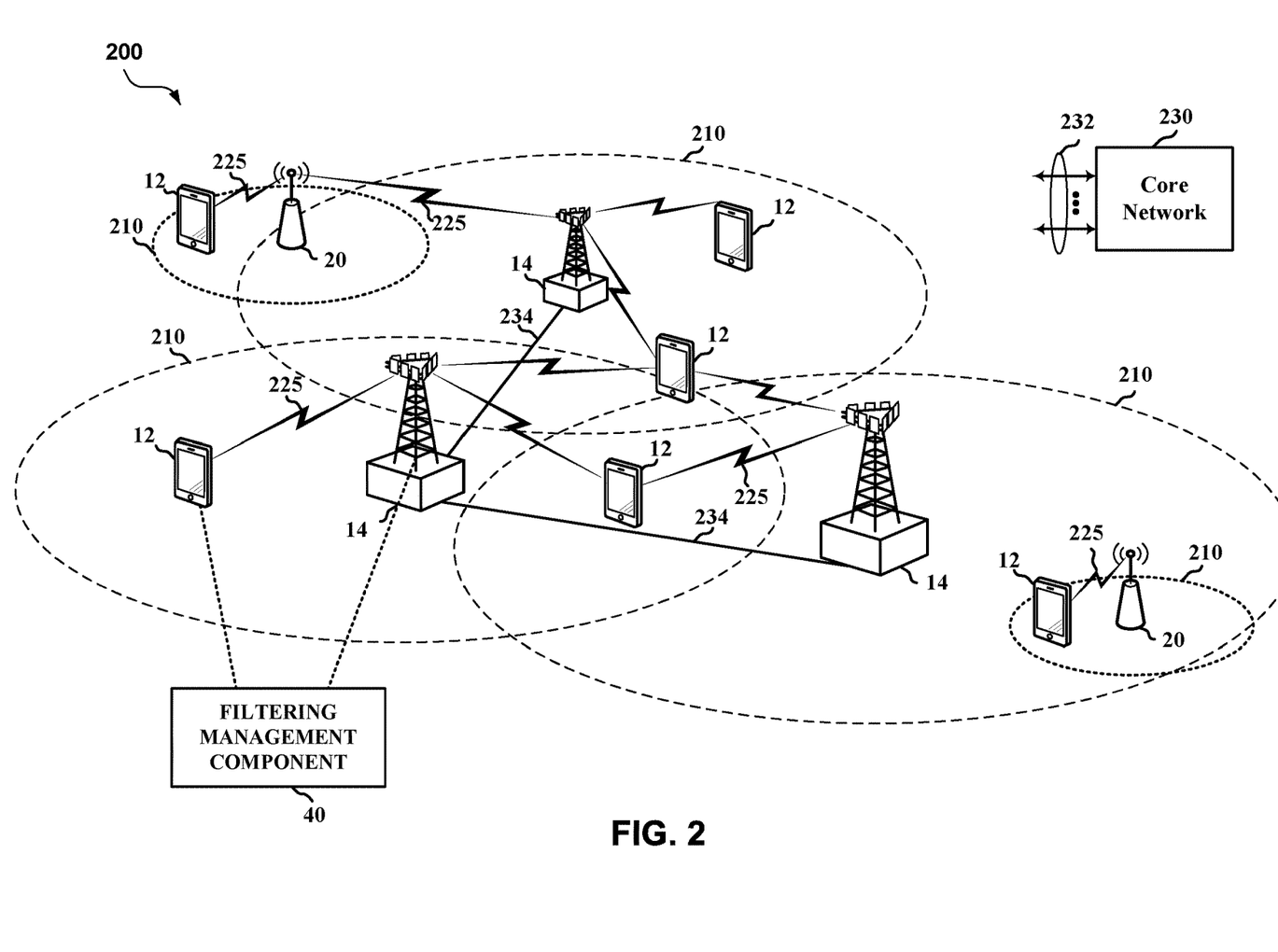
FIG. 2 is a block diagram illustrating a second example of a wireless communications system including multiple UEs for communicating with one or more base stations to perform timing control with filtering operations, according to one or more of the presently described aspects.

Referring to FIG. 2, a diagram illustrates an example of a wireless communications system 200, in accordance with aspects described herein. In some examples, the wireless communications system 200 may include the wireless communications system 100 in FIG. 1, and may include a plurality of network entities 14 and/or 20 (e.g., base stations, gNBs, or WLAN network entities), a number of UEs 12, and one or more core networks 230. In an aspect, one or more of the UEs 12, the network entity 14, or the network entity 20, may include the filtering management component 40 configured to manage filtering operations. The filtering management component 40 may be configured to perform at least some aspects of the techniques or methods described above in wireless communications, including 5G NR. One or more of the network entities 14 or 20 may communicate with the UEs 12 under the control of a base station controller (not shown), which may be part of the core network 230, the network entity 14, or the network entity 20 (e.g., a base station or a gNB) in various examples.

In an aspect, the network entity 14 or 20 may communicate control or system information and/or user data with the core network 230 through backhaul links 232. In some cases, the network entity 14 and the network entity 20 may communicate, either directly or indirectly, with each other over backhaul links 234, which may be wired or wireless communication links. The wireless communications system 200 may support operation on multiple carriers (waveform signals of different frequencies). Multi-carrier transmitters may transmit modulated signals simultaneously on the multiple carriers. For example, each communication link 225 (e.g., wireless communications 26 in FIG. 1) may be a multi-carrier signal modulated according to the various radio technologies described above. Each modulated signal may be sent on a same or different carrier and may carry control or system information (e.g., reference signals, control channels, MIB, or SIBs), overhead information, data, etc.

In some examples, the network entity 14 or 20 may wirelessly communicate with the UEs 12 via one or more antennas. Each of the network entity 14 and the network entity 20 may provide communication coverage for a respective coverage area 210. In some examples, the network entity 14 or 20 may be referred to as a base station, a NodeB, an eNodeB, a Home NodeB, a Home eNodeB, a gNB, or an access point. In some cases, at least a portion of the wireless communications system 200 may be configured to operate on a spatial multiplexing (e.g., multiple-input and multiple-output (MIMO)) scheme in which one or more of the UEs 12 and one or more of the network entity 14 or 20 may be configured to support transmissions on closed-loop MIMO and/or open-loop MIMO scheme.

In network communication systems using LTE/LTE-A, 5G NR, or similar communication technologies, the terms eNodeB or eNB or gNB may be used to describe the network entity 14 or 20, though concepts described herein may be applied to other types of network entity in other types of communication technologies. For example, the wireless communications system 200 may be an LTE or a 5G NR network in which different types of network entity provide coverage for various geographical regions. For example, each of the network entity 14 and the network entity 20 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 12 with service subscriptions with the network provider. A small cell may cover a relatively smaller geographic area and may allow unrestricted access by UEs 12 with service subscriptions with the network provider, for example, and in addition to unrestricted access, may also provide restricted access by UEs 12 having an association with the small cell (e.g., UEs in a closed subscriber group (CSG), UEs for users in the home, and the like). A base station for a macro cell may be referred to as a macro base station. A base station for a small cell may be referred to as a small cell base station. A base station may support one or multiple (e.g., two, three, four, and the like) cells.

In some aspects, the core network 230 may communicate with the base stations or other network entity 14 or 20 via one or more backhaul links 232 (e.g., S1 interface). The network entity 14 and the network entity 20 may also communicate with one another, e.g., directly or indirectly via backhaul links 234 (e.g., X2 interface, etc.) and/or via backhaul links 232 (e.g., through core network 230).

In some examples, the UEs 12 may be dispersed throughout the wireless communications system 200, and each UE 12 may be stationary or mobile. The UE 12 may be referred to by those skilled in the art as a suitable terminology discussed herein. The UE 12 may be able to communicate with macro base stations, small cell base stations, relays, and the like. The UE 12 may be able to communicate over different access networks, such as cellular or other WWAN access networks, or WLAN access networks.

The communication links 225 (e.g., wireless communications 26 in FIG. 1) shown in wireless communications system 200 may include uplink transmissions from the UE 12 to the network entity 14 or 20, and/or downlink transmissions (e.g., MIBs or SIBs) from the network entity 14 or 20 to the UE 12. The downlink transmissions may also be called forward link transmissions while the uplink transmissions may also be called reverse link transmissions. The communication links 225 may carry transmissions of each hierarchical layer which, in some examples, may be multiplexed in the communication links 225. The UEs 12 may be configured to collaboratively communicate with multiple network entities (e.g., network entity 14 and network entity 20) through, for example, MIMO, carrier aggregation (CA), Coordinated Multi-Point (CoMP), or other schemes. MIMO techniques use multiple antennas on the network entity 14 or 20 and/or multiple antennas on the UE 12 to transmit multiple data streams. The MIMO techniques may include closed-loop MIMO and/or open-loop MIMO scheme. CA may utilize two or more component carriers (CCs) on a same or different serving cell for data transmission. CoMP may include techniques for coordination of transmission and reception by a number of network entities (e.g., network entity 14 or network entity 20) to improve overall transmission quality for UEs 12 as well as increasing network and spectrum utilization.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Figure 3:
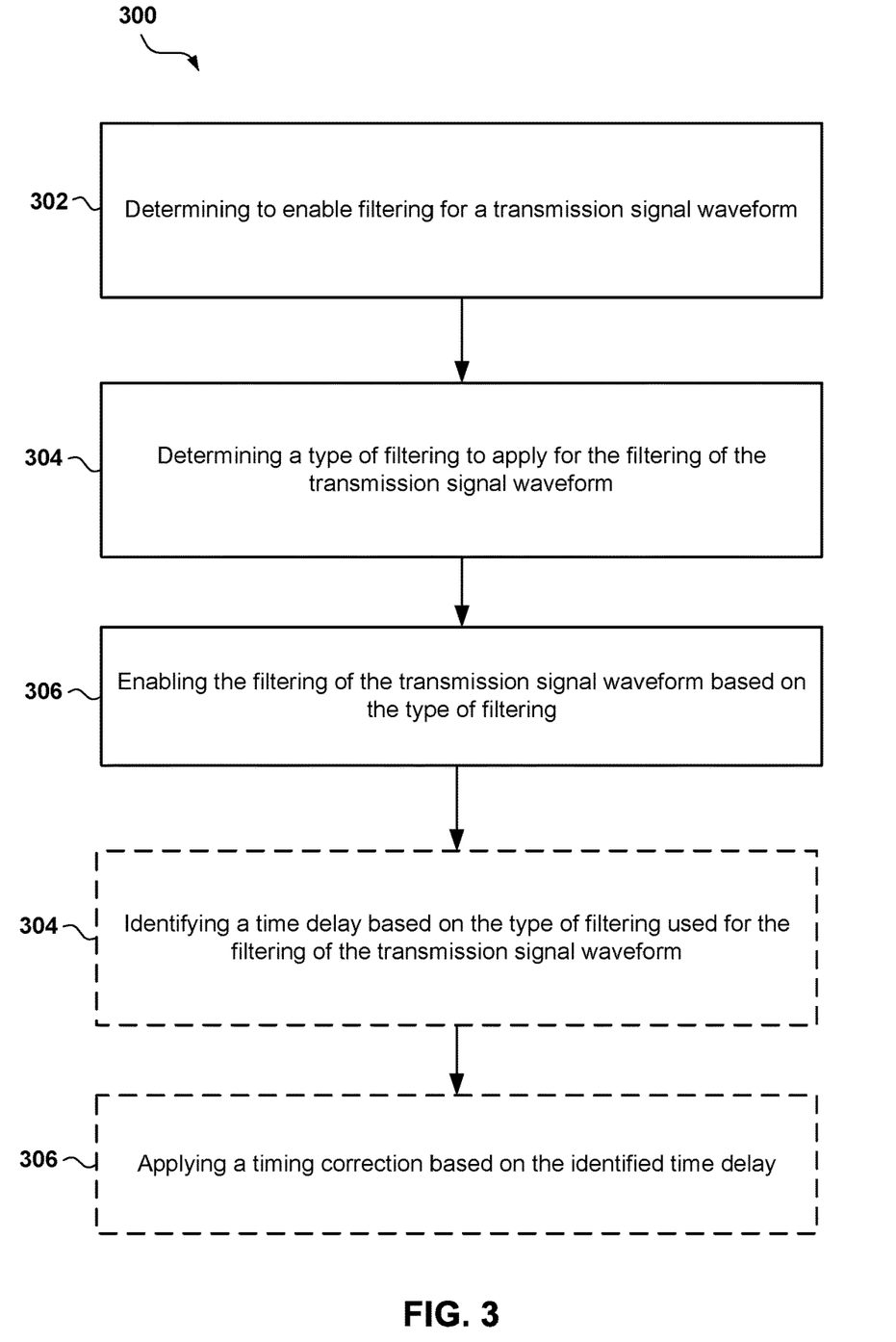
FIG. 3 is a flow diagram of an example method for timing control with filtering operations, according to one or more of the presently described aspects.

Referring to FIG. 3, in an operational aspect, an apparatus (e.g., UE 12, network entity 14, or network entity 20 in FIG. 1) may perform one or more aspects of a method 300 for managing filtering operations in a wireless communications system (e.g., a 5G NR system). For example, one or more of the processors 103, the memory 130, the modem 108, the transceiver 106, the filtering management component 40, the domain determining component 42, the timing control component 44, and/or the filter parameter management component 46, may be configured to perform aspects of the method 300.

In an aspect, at block 302, the method 300 may include determining to enable filtering for a transmission signal waveform. For example, the filtering management component 40, and/or the domain determining component 42, in conjunction with one or more of the processors 103, the memory 130, the modem 108, and/or the transceiver 106, may be configured to determine to enable filtering for a transmission signal waveform. In an example, the determination of enabling filtering may be based on one or more of a filtering parameter, a received indication (e.g., MIB, SIB, RRC message), or a trigger, as previously described. In some examples, the transmission signal waveform is an OFDM signal such as a CP-OFDM, a DFT-spread OFDM or an SCFDM, or an IFDM.

In an aspect, at block 304, the method 300 may also include determining a type of filtering to apply for the filtering of the transmission signal waveform. For example, the filtering management component 40, and/or the domain determining component 42, in conjunction with one or more of the processors 103, the memory 130, the modem 108, and/or the transceiver 106, may be configured to determine a type of filtering to apply for the filtering of the transmission signal waveform. In an example, the filtering may be time-domain filtering or frequency-domain filtering. The type of filtering to apply for the filtering of the transmission signal waveform may be determined based on one or more of a filtering parameter, a received indication (e.g., MIB, SIB, RRC message), or a trigger (e.g., a grant with PI/2 BPSK), as previously described.

In another aspect, at block 306, the method 300 may include enabling the filtering of the transmission signal waveform based on the type of filtering. For example, the filtering management component 40, and/or the domain determining component 42, in conjunction with one or more of the processors 103, the memory 130, the modem 108, and/or the transceiver 106, may be configured to enable the filtering of the transmission signal waveform based on the type of filtering.

In another aspect, at block 308, the method 300 may optionally include identifying a time delay based on the type of filtering used for the filtering of the transmission signal waveform. In an aspect, for example, the filtering management component 40, and/or the timing control component 44, in conjunction with one or more of the processors 103, the memory 130, the modem 108, and/or the transceiver 106, may be configured to identify a time delay based on the type of filtering used for the filtering of the transmission signal waveform.

In an aspect, at block 310, the method 300 may optionally include applying a timing correction based on the identified time delay. In an aspect, for example, the filtering management component 40, timing control component 44, and/or filter parameter management component 46, e.g., in conjunction with one or more of the processors 103, memory 130, modem 108, and/or transceiver 106, may be configured to apply or use a timing correction based on the identified time delay at block 304. In some examples, the timing correction is applied when time-domain filtering is active. In some cases, the timing correction is based on one or more filter parameters discussed herein.

Several aspects of a telecommunications system have been presented with reference to an LTE/LTE-A or a 5G communication system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Moreover, nothing disclosed herein is intended to be dedicated to the public regardless of whether such disclosure is explicitly recited in the claims.

What is claimed is:

1. A method of wireless communications, comprising:
receiving an indication to lower a peak-to-average power ratio (PAPR) of a transmission signal waveform;
determining a filter type to apply for filtering a transmission signal waveform in response to the receiving the indication, wherein the filter type includes one of a time-domain filtering scheme applied as a convolution of filter impulse response with time domain samples or a frequency domain filtering scheme applied by per-tone scaling of samples;
dynamically enabling the filtering of the transmission signal waveform based on the filter type; and
transmitting the transmission signal waveform based on the filter type and in response to the dynamically enabling the filtering of the transmission signal waveform.

2. The method of claim 1, further comprising:
identifying a time delay based on the filter type used for the filtering of the transmission signal waveform; and
applying a timing correction to the transmission signal waveform based on the time delay.

3. The method of claim 2, wherein the indication is based on a trigger to enable the time-domain filtering scheme, the trigger indicating one or more timing-correction behaviors.

4. The method of claim 2, wherein the timing correction is based on one or more filter parameters.

5. The method of claim 4, wherein the one or more filter parameters comprise at least one of an indication of whether the filtering is enabled or disabled, an indication of whether the filtering is performed in time domain or frequency domain, or one or more filter coefficients.

6. The method of claim 4, wherein the one or more filter parameters are configured via a master information block (MIB), a system information block (SIB), a Radio Resource Control (RRC) message, a medium access control (MAC) control element (MAC-CE), or downlink control information (DCI).

7. The method of claim 2, wherein the timing correction is different for data versus a demodulation reference signal (DMRS) of a transmission.

8. The method of claim 2, wherein the timing correction is excluded when evaluating timing-accuracy requirements.

9. An apparatus for wireless communications, comprising:
a transceiver;
a memory configured to store instructions; and
one or more processors communicatively coupled with the transceiver and the memory, wherein the one or more processors are configured to execute the instructions to:
receive an indication to lower a peak-to-average power ratio (PAPR) of a transmission signal waveform;
determine a filter type to apply for filtering a transmission signal waveform in response to receiving the indication, wherein the filter type includes one of a time-domain filtering scheme applied as a convolution of filter impulse response with time domain samples or a frequency domain filtering scheme applied by per-tone scaling of samples;
dynamically enable the filtering of the transmission signal waveform based on the filter type; and transmit the transmission signal waveform based on the filter type and in response to dynamically enabling the filtering of the transmission signal waveform.

10. The apparatus of claim 9, wherein the one or more processors is further configured to execute instructions to:
identify a time delay based on the filter type used for the filtering of the transmission signal waveform; and
apply a timing correction to the transmission signal waveform based on the time delay.

11. The apparatus of claim 10, wherein the indication is based on a trigger to enable the time-domain filtering scheme, the trigger indicating one or more timing-correction behaviors.

12. The apparatus of claim 10, wherein the timing correction is based on one or more filter parameters.

13. The apparatus of claim 12, wherein the one or more filter parameters comprise at least one of an indication of whether the filtering is enabled or disabled, an indication of whether the filtering is performed in time domain or frequency domain, or one or more filter coefficients.

14. The apparatus of claim 12, wherein the one or more filter parameters are configured via a master information block (MIB), a system information block (SIB), a Radio Resource Control (RRC) message, a medium access control (MAC) control element (MAC-CE), or downlink control information (DCI).

15. The apparatus of claim 10, wherein the timing correction is different for data transmission versus a demodulation reference signal (DMRS) transmission.

16. The apparatus of claim 10, wherein the timing correction is excluded when evaluating timing-accuracy requirements.

17. An apparatus for wireless communications, comprising:
means for receiving an indication to lower a peak-to-average power ratio (PAPR) of a transmission signal waveform;
means for determining a filter type to apply for filtering a transmission signal waveform in response to receiving the indication, wherein the filter type includes one of a time-domain filtering scheme applied as a convolution of filter impulse response with time domain samples or a frequency domain filtering scheme applied by per-tone scaling of samples;
means for dynamically enabling the filtering of the transmission signal waveform based on the filter type; and
means for transmitting the transmission signal waveform based on the filter type and in response to dynamically enabling the filtering of the transmission signal waveform.

18. The apparatus of claim 17, further comprising:
means for identifying a time delay based on the filter type used for the filtering of the transmission signal waveform; and
means for applying a timing correction to the transmission signal waveform based on the time delay.

19. The apparatus of claim 18, wherein the indication is based on a received trigger to enable the time-domain filtering scheme, the trigger indicating one or more timing-correction behaviors.

20. The apparatus of claim 18, wherein the timing correction is based on one or more filter parameters.

21. The apparatus of claim 20, wherein the filter parameters comprise at least one of an indication of whether the filtering is enabled or disabled, an indication of whether the filtering is performed in time domain or frequency domain, or one or more filter coefficients.

22. The apparatus of claim 20, wherein the one or more filter parameters are configured via a master information block (MIB), a system information block (SIB), a Radio Resource Control (RRC) message, a medium access control (MAC) control element (MAC-CE), or downlink control information (DCI).

23. The apparatus of claim 18, wherein the timing correction is different for data transmission versus a demodulation reference signal (DMRS) transmission.

24. The apparatus of claim 18, wherein the timing correction is excluded when evaluating timing-accuracy requirements.

25. A non-transitory computer-readable medium, comprising code executable by one or more processors to perform operations of:
receiving an indication to lower a peak-to-average power ratio (PAPR) of a transmission signal waveform;
determining a filter type to apply for filtering a transmission signal waveform in response to receiving the indication, wherein the filter type includes one of a time-domain filtering scheme applied as a convolution of filter impulse response with time domain samples or a frequency domain filtering scheme applied by per-tone scaling of samples;
dynamically enabling the filtering of the transmission signal waveform based on the filter type; and
transmitting the transmission signal waveform based on the filter type and in response to the dynamically enabling the filtering of the transmission signal waveform.

26. The non-transitory computer-readable medium of claim 25, further comprising code executable by one or more processors to perform the operations of:
identifying a time delay based on the filter type used for the filtering of the transmission signal waveform; and
applying a timing correction to the transmission signal waveform based on the time delay.

* * * * *